United States Patent [19]
van der Meer et al.

[11] Patent Number: 4,794,137
[45] Date of Patent: Dec. 27, 1988

[54] THERMOPLASTIC POLYMER MIXTURE COMPRISING POLYFUNCTIONAL DIENE COMPOUNDS

[75] Inventors: Roelof van der Meer, AZ Bergen op Zoom; Jan Bussink, CT Bergen op Zoom, both of Netherlands

[73] Assignee: General Electric Company, Selkirk, N.Y.

[21] Appl. No.: 889,983

[22] Filed: Jul. 24, 1986

[30] Foreign Application Priority Data

Jul. 24, 1985 [NL] Netherlands .......................... 850217

[51] Int. Cl.$^4$ ................................................ C08K 5/52
[52] U.S. Cl. ..................................... 524/142; 524/141; 524/157; 524/508; 525/132; 525/392; 525/396; 525/397

[58] Field of Search ............... 524/141, 142, 157, 508; 525/132, 392, 396, 397

[56] References Cited

U.S. PATENT DOCUMENTS 4,154,712  2/1979  Lee, Jr. ............................... 524/141
4,389,516  6/1983  Sugio et al. ......................... 525/534

*Primary Examiner*—Jacob Ziegler
*Attorney, Agent, or Firm*—Francis T. Coppa

[57] ABSTRACT

The invention relates to thermoplastic polymer mixtures based on a polyphenylene ether which comprise an aromatic phosphate compound and a polyfunctional diene compound. The polymer mixtures according to the invention have a reduced sensitivity to stresses in the presence of solvents and an improved notch impact value in comparison with polymer mixtures not comprising a polyfunctional diene compound.

4 Claims, No Drawings

THERMOPLASTIC POLYMER MIXTURE COMPRISING POLYFUNCTIONAL DIENE COMPOUNDS

This application claims priority from an application first filed in the Netherlands on July 24, 1985 having Ser. No. 850,217.

The invention relates to a thermoplastic polymer mixture comprising a polyphenylene ether and a softener.

The polymer mixtures according to the invention have a reduced sensitivity to stresses in the presence of solvents (environmental stress crack resistance), a greater melting strength, which is of importance for certain thermoplastic shaping methods, for example, blow moulding, and an improved notch impact value, all this compared with the polymer mixtures which comprise only a polyphenylene ether and a softener.

The polymer mixture according to the invention is characterized in that it comprises the following constituents:

A. a polyphenylene ether in a quantity from 80–99.4% by weight, and
B. a softener in a quantity from 19.5–0.5% by weight, and
C. a polyfunctional conjugated diene compound in a quantity from 0.01–4% by weight, the weight percentages of the constituents A, B and C being calculated with respect to the sum of the weights of the constituents A, B and C with the exception of such mixtures comprising a polyvinyl aromatic compound also.

The improvement as regards the above-mentioned properties is ascribed to the addition of a polyfunctional conjugated diene compound C.

A curable polyphenylene ether mass which consists of a polyphenylene ether resin and at least a polyfunctional compound is disclosed in U.S. Pat. No. 4,389,516. The polyfunctional compound may be a polyfunctional maleimide, for example, the bismaleimide derived from maleic anhydride and bis-(aminophenyl)-methane. The known resin masses are thermohardeners which can withstand high temperatures particularly readily.

The polymer masses according to the invention are not thermohardeners but thermoplasts.

In non-pre-published Netherlands Patent Application, No. 84 03 091 polymer mixtures are described which comprise a polyphenylene ether, a polyvinyl aromatic compound and a polyfunctional compound, for example, a polyfunctional conjugated diene compound.

It is not an object of the present invention to obtain exclusive rights for polymer mixtures which also comprise a polyvinyl aromatic compound.

The polymer mixtures according to the invention comprise at least the above-mentioned constituents A, B and C. It is assumed that a reaction occurs between two or more of the constituents A, B and C, which reaction leads to a polymer mixture having the desired properties. Which reaction (or reactions) occurs (or occur) is not known.

A. Polyphenylene ethers

Polyphenylene ethers are compounds known per se. For this purpose reference may be made to U.S. Pat. No. 3,306,874; 3,306,875; 3,257,357 and 3,257,358. Polyphenylene ethers are usually prepared by an oxidative coupling reaction - in the presence of a copper amine complex - of one or more two-fold or three-fold substituted phenols, homopolymers and copolymers, respectively, being obtained. Copper amine complexes derived from primary, secondary and/or tertiary amines may be used. Examples of suitable polyphenylene ethers are:

poly(2,3-dimethyl-6-ethylphenylene-1,4-ether)
poly(2,3,6-trimethylphenylene-1,4-ether)
poly(2-bromo-6-phenylphenylene-1,4-ether)
poly(2-methyl-6-phenylphenylene-1,4-ether)
poly(2-phenylphenylene-1,4-ether)
poly(2-chlorophenylene-1,4-ether)
poly(2-methylphenylene-1,4-ether)
poly(2-chloro-6-ethylphenylene-1,4-ether)
poly(2-chloro-6-bromophenylene-1,4-ether)
poly(2,6-di-n-propylphenylene-1,4-ether)
poly(2-methyl-6-isopropylphenylene-1,4-ether)
poly(2-chloro-6-methylphenylene-1,4-ether)
poly(2-methyl-6-ethylphenylene-1,4-ether)
poly(2,6-dibromophenylene-1,4-ether)
poly(2,6-dichlorophenylene-1,4-ether)
poly(2,6-diethylphenylene-1,4-ether)
poly(2,6-dimethylphenylene-1,4-ether)

Copolymers, for example copolymers derived from two or more phenols as used in the preparation of the homopolymers mentioned hereinbefore, are also suitable. Furthermore suitable are graft copolymers and block copolymers of vinylaromatic compounds, for example, polystyrene and of polyphenylene ether as described above.

B. Softeners

The polymer mixtures according to the invention comprise a softener, also known as plasticizer. As softeners are to be considered all the softeners suitable for polyphenylene ethers. Examples of suitable softeners are aromatic phosphates, mineral oils, esters, for example alkyladipates and alkylphtalates, epoxy stearates, epoxy tetrahydrophtalates, hydrocarbon resins having a low molecular weight, for example cumarone indene resins, alkyl esters of trimellitic acid, toluene sulphon amides. These compounds and further suitable softeners are disclosed, for example, in U.S. Pat. No. 4,154,712; 4,203,931 and 4,385,146; German Patent Application No. 16 94 310 and 26 59 304; Netherlands Patent Application No. 76 14 511 and the PCT Application PCT/US/81/00 044. Aromatic phosphates are preferably used.

As an aromatic phosphate compound in the polymer mixtures according to the invention may be used an aromatic phosphate compound of the general formula $(RO_3)PO$, wherein R is one or more equal groups, for example, an alkyl group, a cycloalkyl group, an aryl group, an aryl group substituted with one or more alkyl groups, an alkyl group substituted with one or more aryl groups, a halogen atom, a hydrogen atom, at least one R group being of an aromatic character.

Suitable examples are inter alia, phenyl bisdodecyl phosphate, phenyl bisneopentyl phosphate, phenylethylene hydrogen phosphate, phenyl-bis(3,5,5'-trimethylhexyl phosphate), ethyl diphenhyl phosphate, 2-ethylhexyldi(p-tolyl) phosphate, diphenyl hydrogen phosphate, bis-(2-ethylhexyl)-p-tolyl phosphate, tritolyl phosphate, bis-(2-ethylhexyl)-phenyl phosphate, tri(nonylphenyl)-phosphate, phenyl methyl hydrogen phosphate, di(dodecyl)p-tolyl phosphate, tricresyl phosphate, triphenyl phosphate, dibutyl phenyl phosphate, 2-chloroethyl diphenyl phosphate, p-tolyl-bis-(2,5,5'-trimethyl hexyl)-phosphate, 2-ethylhexyl diphenyl phosphate, trimesityphosphate, bis-(2,6-dimethyl phenyl)-phenyl phosphate, bis-(isopropylphenyl)phenyl phosphate and the like. Aromatic phosphate compounds of the above-mentioned formula in which all three R groups represent an equal or different aromatic group are to be preferred.

C. Polyfunctional conjugated diene compound

As a polyfunctional conjugated diene compound the polymer mixtures according to the invention comprise compounds which comprise more than one set of conjugated double bonds or one set of conjugated double bonds and a dienophilic group. Conjugated diene compounds and dienophilic groups are to be understood to mean herein the compounds/groups known as such for Diels-Adler reactions (see, for example, Fieser & Fieser, Advanced Organic Chemistry, New York, 1963, pp. 206–211). It is also possible to use precursors of such compounds.

EP-A-No.0121974 describes polymer mixtures comprising a polyphenylene ether and a conjugated, nonaromatic diene compound, or a dienophilic compound. All mentioned diene compounds and all mentioned dienophilic compounds have one set of conjugated double bonds only or have one dienophilic group only. Said compounds surpress the increase in molecular weight of the polyphenylene ether upon extrusion. They do not improve the environmental stress crack resistance.

Examples of suitable polyfunctional conjugated diene compounds are the divinyl aromatic compounds of the formula $CH_2 = C(R)-C_6H_{(4-p)}Z_p-C(R') = CH_2$, wherein R and R'. independently from each other represent a hydrogen atom, a lower alkyl group (having, for example, 1–6 carbon atoms) or a halogen atom, Z is a hydrogen atom or a halogen atom or a lower alkyl group or a vinyl group. Divinyl benzene may be mentioned by way of example. This compound is preferably used in a quantity of 0.1–2% by weight.

In addition to the constituents mentioned hereinbefore, the polymer mixtures according to the invention may comprise further constituents, such as the usual agents to improve the impact strength, polyolefins, fillers, for example, clay, talcum and mica, reinforcing fibres, for example, glass fibres and carbon fibres, antistatics, stabilizers, flameretarding agents, dyes and pigments, lubricants and the like.

As an agent improving the impact strength, the polymer mixture according to the invention may comprise one or more of the agents known per se for polyphenylene ethers. For this purpose reference may be made, for example, to U.S. Pat. Nos. 4,113,800; 4,383,082; 3,994,856; 4,113,797; 4,191,685; 4,373,055; 4,234,701; 3,833,688; 4,478,979, which Patent Specifications may be deemed to be incorporated herein by reference.

Agents which are particularly suitable to improve the impact strength are the linear or radial styrene butadiene block copolymers, for example, of the type AB, ABA, A(B)4, used conventionally in polymer mixtures based on polyphenylene ether. Partially hydrogenated or non-hydrogenated styrene butadiene diblock copolymers, partially hydrogenated or non-hydrogenated styrene butadiene styrene triblock copolymers and partially or not partially hydrogenated radial styrene butadiene block copolymers may be mentioned by name. Partial hydrogenation or non-hydrogenation refers to the degree of C-C unsaturation in the diene block portion of the copolymer.

The polymer mixtures according to the invention may be used by mixing in the melt the abovementioned constituents A, B and C. Mixing in the melt is conventionally carried out in an extruder at temperatures from 250 to 310° C. The extrudate is usually chopped up. The resulting pieces may be formed into articles by injection moulding or extrusion, for example by blow moulding. It is alternatively possible to prepare the polymer mixtures according to the invention by first extruding together two of the constituents A, B and C, after which the third constituent with the resulting pre-extrudate is extruded.

The invention will now be described in greater detail with reference to the ensuing specific examples.

Examples I, II and III and comparative examples 1, 2 and 3.

Six polymer mixtures having a composition as indicated in Table A hereinafter were prepared. As a polyphenylene ether was always used the same poly(2,6-dimethyl-1,4-phenylene ether) having an intrinsic viscosity of 49 ml/g measured in chloroform at 25° C. As an aromatic phosphate was used a mixture of equal parts by weight of triphenyl phosphate and diphenyl cresyl phosphate. In the examples I, II and III according to the invention, divinylbenzene was always used as a polyfunctional conjugated diene compound; in the comparative examples 1, 2 and 3, no polyfunctional conjugated diene compound was used. In the examples II, III, 2 and 3 a partially hydrogenated styrene butadiene styrene triblock copolymer was used in the polymer mixtures with a ratio polystyrene to polybutadiene of 33 to 67 and a $\overline{Mn}$ of approximately 160,000. In the examples III and 3 a filler (clay) was used.

The said constituents were extruded in a Werner Pfleiderer double blade extruder at a temperature adjusted at 250° C, a speed of 300 r.p.m., at a flow rate of 4 kg per hour. The extrudate was chopped up. Standardized rods were manufactured from the resulting product by means of injection moulding. The following properties were determined: notch impact value according to Izod (ASTM D 256); the environmental stress crack resistance; the tensile strength and the elongation upon fracture (ASTM 638) and the melt viscosity (at 300° C and a shear rate 1500 s$^{-1}$).

The environmental stress crack resistance (ESCR) was determined at ASTM type 1 rods as they are used for determining the tensile strength according to ASTM D 638. Always four or more rods were clamped in a curved metal mould, so that the rods were elongated 0.85% on their outside (outermost fibre). At instant zero the rods (clamped in the mould) were dipped in tri-n-butyl phosphate. The time (in seconds) to the occurrence of the first observable cracks and the time to fracture were determined. The average of four or more measurements is always stated in the Table.

It may be seen from the results of Table A that the addition of a polyfunctional conjugated diene compound, for example, divinyl benzene leads to a strong improvement of the environmental stress crack resistance; moreover, the Izod notch impact value is considerably increased.

TABLE A

| | Example | | | | | |
|---|---|---|---|---|---|---|
| | 1* | I | 2* | II | 3* | III |

Composition

TABLE A-continued

| | Example | | | | | |
|---|---|---|---|---|---|---|
| | 1* | I | 2* | II | 3* | III |
| (parts by weight) | | | | | | |
| Polyphenylene ether | 90 | 90 | 85 | 85 | 70 | 70 |
| Aromatic phosphate | 10 | 10 | 10 | 10 | 10 | 10 |
| Triblock copolymeer | — | — | 5 | 5 | 5 | 5 |
| Clay | — | — | — | — | 15 | 15 |
| Divinyl benzene | — | 0.5 | — | 0.5 | — | 0.5 |
| Properties | | | | | | |
| Melt viscosity (Pa.s) | 412 | 461 | 340 | 435 | 291 | 364 |
| Tensile strength upon fracture (MPa) | 69 | 65 | 56 | 56 | 58 | 59 |
| Elongation upon fracture (%) | 12 | 11 | 12 | 12 | 9 | 10 |
| Izod notch impact value (J/m) | 46 | 64 | 107 | 292 | 237 | 464 |
| ESCR first crack formation (s) | 25 | 112 | 100 | 213 | 145 | 303 |
| ESCR fracture (s) | 25 | 156 | 105 | 366 | 170 | 423 |

*comparative example

I claim:
1. A thermoplastic polymer mixture consisting essentially of:
   A. 80 to 99.4% by weight of at least one polyphenylene ether compound;
   B. 0.5 to 19.5% by weight of a softener compound effective for plasticizing said polyphenylene ether; and
   C. 0.01 to 4.0% by weight of divinyl benzene,
wherein the weight percentages of constituents A, B, and C are based on the weights of A, B, and C taken together.

2. A polymer mixture as in claim 1 wherein said polyphenylene ether compound is primarily poly (2,6-dimethyl-1,4-phenylene ether).

3. A polymer mixture as in claim 1 wherein said softener compound is an aromatic phosphate.

4. A polymer mixture as in claim 1 wherein said divinyl benzene is present in an amount of 0.1 to 2% by weight of the mixture.

* * * * *